Dec. 14, 1943.  H. HILL  2,336,610
VARIABLE SPEED POWER TRANSMISSION
Filed April 1, 1942
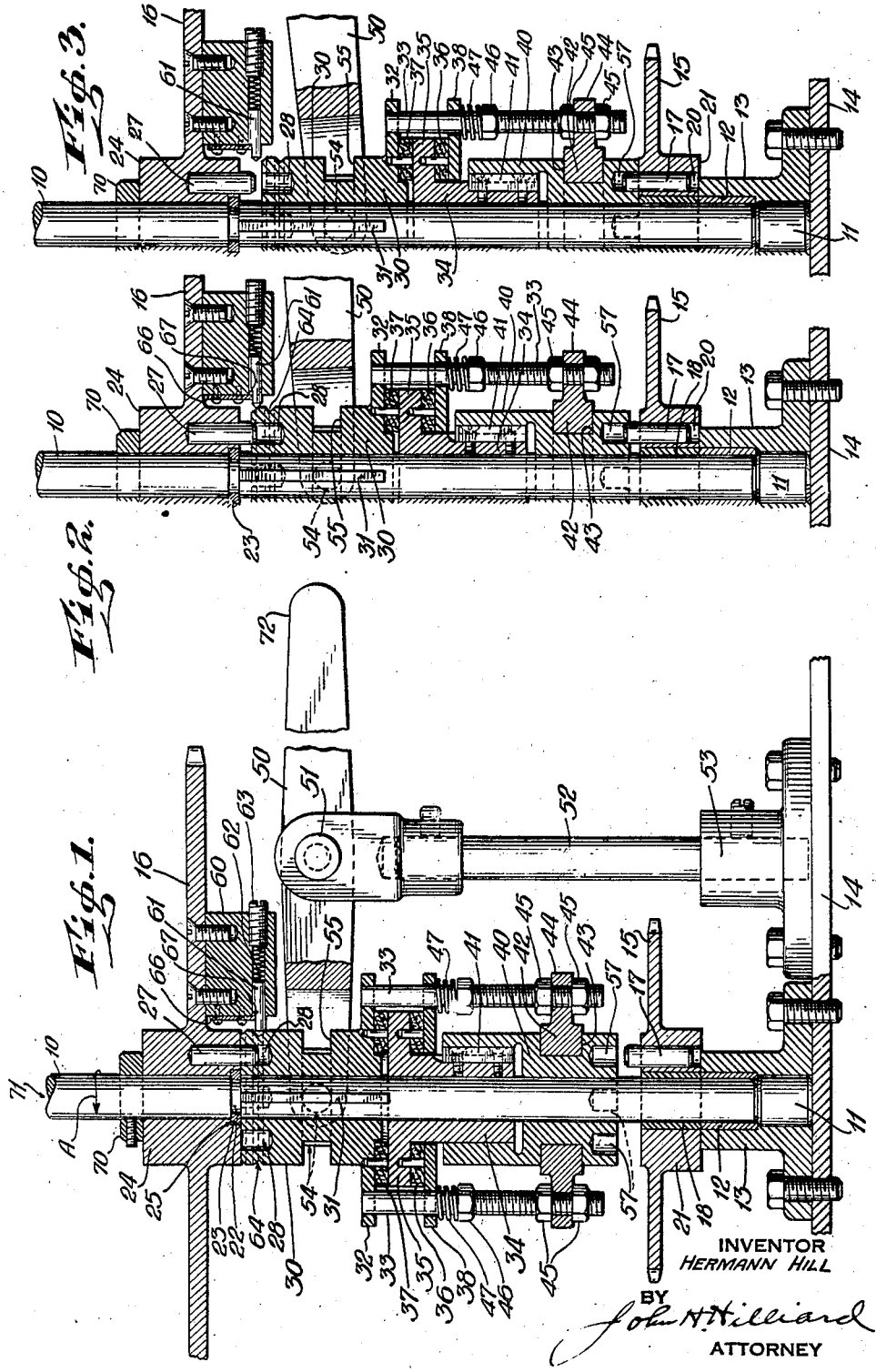
INVENTOR
HERMANN HILL
BY
John H. Hilliard
ATTORNEY Patented Dec. 14, 1943

2,336,610

UNITED STATES PATENT OFFICE 2,336,610

VARIABLE SPEED POWER TRANSMISSION

Hermann Hill, Bridgeport, Conn., assignor to Magazine Repeating Razor Company, Bridgeport, Conn., a corporation of New Jersey Application April 1, 1942, Serial No. 437,119

3 Claims. (Cl. 192—48)

The object of the invention is a mechanical power transmission adapted for shifting from one of two speeds to the other without any break, even momentary, in the continuity of the transmission of power. Such a transmission is useful in situations involving continuous operations such, for example, as the grinding and sharpening of razor blade strip where even a very brief interruption of its travel would ruin the particular length which happens to be at the time passing by the grinding wheels.

Briefly described, the device comprises two spaced sprockets rotatably mounted on a shaft which is the output side of the transmission. Between the sprockets are two collars both slidably mounted on the shaft, one of them being rotatable thereon and the other non-rotatable. The two collars are connected together by a slipping clutch, and each collar and the sprocket adjacent to it are provided with clutching mechanism operable for clutching and de-clutching by sliding the collar along the shaft. The spacing of the sprockets is such that, as one connection is de-clutched, the other clutch starts into engagement before the de-clutching has been completed. The sprockets are running at different angular speeds and therefore, during the operation of disengaging one clutch and engaging the other, the clutch slips to allow for this difference in speeds. As soon as the operation is completed, however, only one clutch is in operation, and it is this clutch which is driving the shaft through the non-rotatable collar.

Referring to the drawing,

Fig. 1 is a sectional view of the transmission in vertical elevation showing the parts shifted to low-speed position;

Fig. 2 is a sectional view in elevation showing the relationship of the parts in the process of shifting;

Fig. 3 is a sectional view in elevation showing the parts shifted to high-speed position.

The rotating parts are all mounted on a single shaft 10 resting on a bearing comprising the step bearing 11 and the bushing 12 confined in a support 13. The support is, in turn, mounted on a base plate 14. The power intake is through two rotors such as gears, pulleys, sprockets, or the like—sprockets as shown in the drawing being preferred. The sprocket 15 may be assumed to be the high-speed sprocket and the sprocket 16 may be assumed to be the low-speed sprocket. These sprockets constitute the input side of the transmission and run continuously but at different angular speeds, being driven by chains from any suitable source of power. The high-speed sprocket 15 is rotatably mounted on the bushing 18 and is provided with a pin 17 fixedly contained in the bore 20 and projecting, as seen in Fig. 1, slightly beyond the hub 21 of the sprocket. The sprocket 16 is also rotatably mounted on the shaft, which is grooved as shown at 22 to accommodate the stop ring 23, the hub 24 of the sprocket being counterbored to accommodate the ring. Like the sprocket 15, it is provided with a pin 27 fixedly mounted in the hub and projecting somewhat beyond the hub.

The collar 30 is slidably mounted on the shaft 10, being keyed thereto however by the key 31 to prevent rotation on the shaft. The collar 30 is provided with a flange 32 from which depend rods 33, 33 welded or otherwise securely fastened in the flange 32. A second collar 34 is rotatably mounted on the shaft and has a flange 35 which with the friction ring 36 acts as a friction clutch member between the friction member 37 and the disk 38. The friction member 37 is secured to the flange 32 by pins in the usual manner and likewise the friction ring 36 is affixed to the flange 35 in the same way. Another collar 40 is rotatably mounted on the shaft 10 and telescopes over the collar 34, being keyed thereto by the key 41. The collar 40 is supported against endwise movement with respect to the collar 34 by a ring yoke 42 loosely carried in the groove 43 in the collar 40. The rods 33 extend through the disk 38 and also through the flange 44 of the ring yoke, each rod being threaded so that the position of the flange 44 can be varied and clamped in any desired set position by the nuts 45, 45. Adjustment of the pressure of the clutch members is effected by screwing the nuts 46 up or down as required to vary the tension of the springs 47.

The collar 34 and the collar 40 virtually constitute a single unit, which is made in two parts only for the purpose of permitting the adjustment by means of the nuts 45.

The transmission is shifted by means of the lever 50 pivotally supported at 51 in the standard 52 which, in turn, projects from the support 53 mounted on the base plate. The lever is forked, each tine of the fork being provided with a stud 54 which engages in the groove 55 in the collar 30. The collar 30 is provided with a series of radially arranged sockets 28 into any one of which the pin 27 may project and the collar 40 is provided with a series of radially arranged sockets 57 into any one of which the pin 17 may project. In other words, each socket may be aligned with the pin which engages it if the cooperating parts are rotated to the proper angular position. Each pin and socket arrangement is in effect, it will be observed, a clutch mechanism engageable and disengageable by sliding the collars along the shaft, the engagement being positive.

The sprocket 16 is provided with a depending block 60 screwed to it, and the block in turn is provided with a releasable locking pin 61 spring-pressed by the spring 62, the pressure of the spring being adjustable by means of the screw 63. The pin engages in a groove 64 in the collar 30 and releasably holds it in the low-speed position with respect to the hub 24 of the sprocket 16. To limit the throw of the pin there is provided a stop plate 66 which engages a shoulder portion 67 of the pin. The part 70 is merely a stop collar to confine the hub 24 on the shaft.

The end 71 of the shaft may be provided with a suitable gear, pulley, worm, or the like for driving whatever mechanism may be desired.

Mode of operation

The mode of operation may be explained as follows:

Assuming that the parts are in the relationship shown in Fig. 1 and that the shaft is being driven in the direction of the arrow A, the sprocket 16 is rotating in the same direction and is driving the shaft through the pin and socket connection 27, 28, the collar 30, and the key 31. The other two collars 34 and 40 are likewise rotating by virtue of the clutch connection and the key 41, although at this time they are performing no function. Next, let it be assumed that the transmission is shifted by lifting the handle 72 of the lever 50: This causes the collar 30, the collar 34, the clutch, and the collar 40 to drop downward as a unit. Before the socket 28 has left the pin 27, the pin 17 enters one of the sockets 57, both pins 27 and 17 being in engagement with one of the sockets with which they are adapted to co-operate. Adjustment of the nuts 45 may be made properly to effect this relationship. This causes the slipping clutch to slip at a rate corresponding to the difference in speeds as between the two sprockets (see Fig. 2). As the raising of the lever handle continues, the socket 28 is completely disengaged from the pin 27 and the drive is now wholly from the sprocket 15 through the collar 40, the key 41, the collar 34, the clutch, the collar 30, and the key 31. The actions just described are, of course, reversed when the handle 72 is pressed downwardly to restore the low-speed connection.

The important thing to note is that at no time during the shift or at any other time does the input or output of power cease.

While I have described a certain particular construction in which my invention is incorporated, I do not desire to be limited to this particular embodiment since many changes and modifications may easily be made without departing from the spirit and scope of the invention as set forth in the following claims.

I claim:

1. A two-speed power transmission comprising a shaft, two power receiving rotors rotatably mounted thereon, two collars slidably mounted on the shaft end to end and between the rotors, one rotatably and the other non-rotatably, slipping clutch mechanism connecting the collars together, the rotors being spaced from each other a distance greater than the total length of the two collars, a clutch connection between each collar and the rotor adjacent to its engageable and disengageable by sliding the collars as a unit along the shaft, said clutch connection comprising a member projecting from one of them and adapted and positioned to enter and leave a socket in the other as the collars are caused to slide for such engagement and disengagement, each projecting member being long enough so that a clutch connection being engaged effects such engagement before disengagement of the other clutch connection.

2. A two-speed power transmission comprising a shaft, two power receiving rotors rotatably mounted thereon and spaced apart, a collar slidably but non-rotatably mounted on the shaft between the rotors and having clutch connection with one of the rotors engageable and disengageable by sliding the collar along the shaft, a second collar slidably and rotatably mounted on the shaft between the rotors and having clutch connection with the second of said rotors and likewise engageable and disengageable by sliding the collar along the shaft, slipping clutch mechanism connecting the collars together end to end, the total length of the two collars being less than the space between the rotors but great enough so that as the collars as a unit are caused to slide along the shaft engagement of one clutch takes place before disengagement of the other is completed.

3. A two-speed power transmission comprising a shaft, two power receiving rotors rotatably mounted thereon and spaced apart, a collar slidably but non-rotatably mounted on the shaft between the rotors and having clutch connection with one of the rotors engageable and disengageable by sliding the collar along the shaft, a second collar slidably and rotatably mounted on the shaft between the rotors and having clutch connection with the second of said rotors and likewise engageable and disengageable by sliding the collar along the shaft, slipping clutch mechanism connecting the collars together end to end, the total length of the two collars being less than the space between the rotors but great enough so that as the collars as a unit are caused to slide along the shaft engagement of one clutch takes place before disengagement of the other is completed, and means for adjusting the spacing of the collars with respect to each other.

HERMANN HILL.

CERTIFICATE OF CORRECTION.

Patent No. 2,336,610.   December 14, 1943.

HERMANN HILL.

It is hereby certified that error appears in the printed specification of the above numbered patent requiring correction as follows: Page 2, second column, line 13, claim 1, for "its" read --it--; and that the said Letters Patent should be read with this correction therein that the same may conform to the record of the case in the Patent Office.

Signed and sealed this 15th day of February, A. D. 1944.

(Seal)

Henry Van Arsdale,
Acting Commissioner of Patents.